United States Patent [19]

Groff

[11] Patent Number: 4,586,905
[45] Date of Patent: May 6, 1986

[54] COMPUTER-ASSISTED AUDIO/VISUAL TEACHING SYSTEM

[76] Inventor: James W. Groff, 15335 La Alameda, Morgan Hill, Calif. 95037

[21] Appl. No.: 712,399

[22] Filed: Mar. 15, 1985

[51] Int. Cl.⁴ .............................................. G09B 7/04
[52] U.S. Cl. ..................................... 434/307; 434/308
[58] Field of Search ................................ 434/307–309

[56] References Cited

U.S. PATENT DOCUMENTS

| | | | |
|---|---|---|---|
| 3,996,671 | 12/1976 | Foster | 434/307 |
| 4,384,284 | 5/1983 | Juso et al. | 434/307 |
| 4,395,236 | 7/1983 | Gotthold | 434/307 |
| 4,518,361 | 5/1985 | Conway | 434/307 |

*Primary Examiner*—Richard C. Pinkham
*Assistant Examiner*—Vincent A. Mosconi

[57] ABSTRACT

A computer-assisted audio/visual teaching system which presents synchronized audio and visual instructional material to an individual student. Standard classroom components, including a microcomputer, television monitor, disk drive (or computer cassette recorder), and stereo cassette player are combined with an audio control module to present drill and practice and tutorial lessons containing written text and graphics, as well as recorded instructional narrative which is synchronized with a computer program. The audio control module allows computer-generated sound effects to be incorporated with recorded instructional narrative. A student observes the computer-driven visual portion of an instructional lesson on a television monitor and listens to the player-reproduced audio portion of the lesson through headphones. At selected intervals, the lesson presents questions or problems to which the student responds via a computer keyboard. Depending on the student's response, narration recorded on a 2-channel audio tape provides appropriate positive reinforcement or remedial instruction. Since few inexpensive stereo players include a remote control jack, a power control module is provided to remotely control power to the player. Actuation control signals to energize the cassette player are obtained from a television monitor screen, computer output port, or from a computer-generated tone. The cassette player is deenergized by control signals recorded on one channel of the above-mentioned 2-channel audio tape.

12 Claims, 7 Drawing Figures

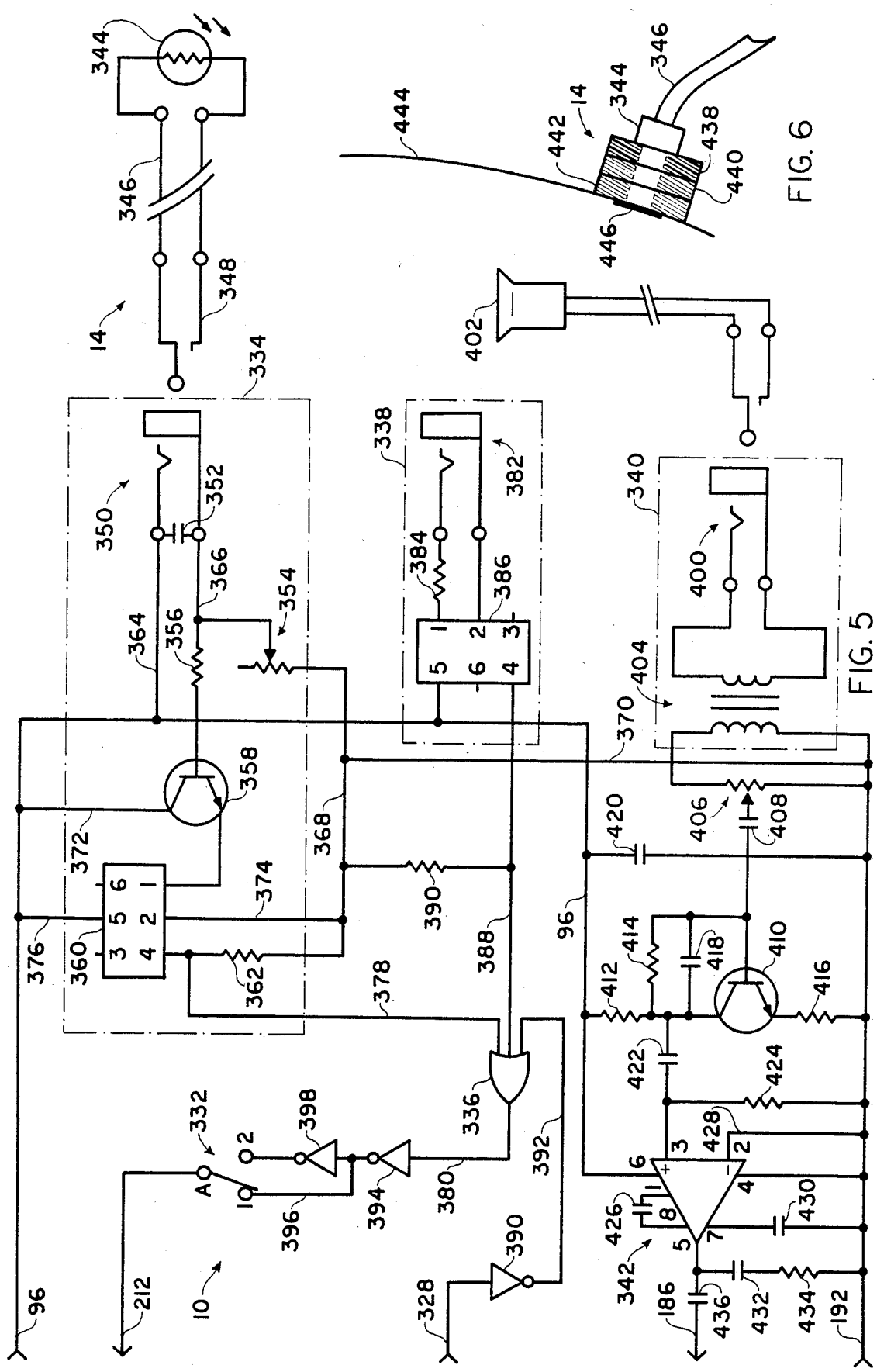

COMPUTER-ASSISTED AUDIO/VISUAL TEACHING SYSTEM

BACKGROUND OF THE INVENTION

The present invention relates to the field of teaching aids, and is more particularly directed to a computer-assisted audio/visual teaching system used in the classroom to present tutorial or drill and practice lessons to an individual student.

With the advent of computer-aided instruction (CAI) in the 1960's, largely under the aegis of Professor Patrick Suppes at Stanford University and Dr. Donald Bitzer at the University of Illinois, our nation's schools inexorably crossed the threshold of what some call an ultimate breakthrough in education. Although CAI has not proven to be a "breakthrough" in any sense of the word, it is welcomed by most educators as simply another tool in the educational audio/visual armamentarium. Probably the most significant contribution of some 550,000 classroom computers now in use is their ability to tirelessly present educational material to an individual student in a way that allows the student to interact, one-to-one, with his "electronic teacher" and to progress at his own pace.

Historically, computer-aided instruction consists of drill, tutorial, and simulation lessons, although CAI is anathema to many educators and computer cognoscenti who feel the student really isn't learning anything unless he is seated in a computer lab busily writing his own programs in Pascal, BASIC, LOGO, LISP, APL, etc. Whatever use is made of the school computer, the audio in "audio/visual" is usually lacking, except for occasional calliope-sounding tunes, beeps, peeps, and spaceship sound effects which punctuate any given activity on a television monitor. If the classroom computer is to excell as an "electronic teacher" for the individual student, computer hardware and software manufacturers must devote as much attention to sound as has been devoted to graphics. When sound is used, most classroom computers utilize the speaker of a connected television monitor or one within the computer's housing for an audio output. Audio output jacks which accommodate headphones for private listening are conspicuously lacking, thereby turning any classroom or school computer lab into a grand cacophony not unlike that of a neighborhood video arcade.

Some manufacturers are now, however, realizing that more than arcade-like sound effects are needed to truly improve the computer's educational potential as an audio/visual teaching device. Instead of beeps, peeps, and laser gun sounds, human speech now accompanies some of the current educational computer rograms. The hardware/software "state-of-the-art" modality for this is speech synthesis, which may or may not sound at all human. Synthetic speech systems which utilize a "canned" speech vocabulary can farily well approximate human-sounding speech, but lack flexibility in that their vocabularies are limited to pre-encoded words provided on disk or read-only memory (ROM). These systems, which are generally classified as direct waveform coded or linear predictive coded (LPC), require about 48 kilobytes of memory to provide from 20 seconds to 5 minutes of speech. The more memory used, the better synthetic speech sounds. Conversely, a third type of speech synthesizer using formant synthesis can produce up to one hour of speech with 48K bytes of memory, but the resultant speech sounds for all the world like a gnome or leprechaun with a thick Swedish accent.

Formant synthesis truly represents synthetic speech, since its "vocabulary" consists of elemental speech sounds and variants (phonemes and allophones) rather than words. Using this phoneme-driven synthesizer, speech is produced by stringing together various phonemes and allophones. Since elemental speech sounds can be strung together to produce any word, formant synthesis provides the teacher with unlimited vacabulary—a distinct advantage over direct waveform and LPC synthesizers. The classroom teacher soon discovers, however, that synthetic speech produced by formant synthesis is robot-like and partially unintelligible to him or his students. One source of pride to the user of a speech synthesis system is how well others can understand the voice output of that system. A standard test is usually given the synthesizer which requires that five or six words by synthesized for each of 32 major phonemes. If all of the words can be recognized, the synthesizer can be considered to be quite accurate. Although some educators tolerate the vagaries of computer speech synthesis, serious pedagogic problems arise when it is used in the early grades where students are just learning correct word pronunciation.

Current "state-of-the-art" computer aided instruction can include some $1,500 to $2,500 for a computer, monitor and disk drive, plus another $300 to $3,000 for a speech synthesizer. But this is just the beginning for a truly "high-tech" CAI classroom: add another $800 to $1,000 for a videodisc player which can be controlled by a computer and another $400 to $800 for a videodisc/computer interface card, and classroom CAI can include photographic-quality still and motion pictures which are all incorporated into an interactive lesson program. In most cases, computer graphics, such as the cursor, can overlay the videodisc image. The above-mentioned speech synthesizer will not usually be needed, since voice narration is also contained on the videodisc. But, as with "canned" synthesizer vocabularies, the instructor will be unable to personally modify the audio or video portions of his lessons unless he wants to spend $2,000 to $3,000 to custom-record a master videodisc using a manufacturer's equipment, or purchase a videodisc recorder/player for yet another $20,000 to $30,000. Much the same expense ($20 to $200 per word) is involved, if the teacher wishes to custom-encode vocabulary for an LPC speech synthesizer. It clearly becomes not a matter of the availability of high technology for CAI but a matter of what the schools can afford to pay for that technology.

Probably because of the above-mentioned costs, few school CAI lessons incorporate human speech and are primarily video in nature, except for the previously mentioned arcade sound effects. To truly make the classroom computer a useful device, the audio output must be capable of clearly presenting, in an unlimited vocabulary, instructional material—preferably in the teacher's own voice. Additionally, since those class members not involved in CAI should not be distracted by the audio output of a classroom computer, the computer must be provided with headphones for private listening. Rather than utilize any of the several and complex schemes for producing synthetic speech, the CAI audio output can simply be that of an ordinary cassette tape which is played back by a standard $20 to $30 cassette player in synchronization with any given computer program. This method is far less expensive than computer speech synthesis and results in a high fidelity speech output. Music can also be incorporated with voice on the cassette tape, and the usual computer arcade-like sound effects can additionally be coupled to the tape output.

The use of cassette tapes, rather than speech synthesis, to provide the audio portion for CAI is well-known. One such application utilizes a two-channel cassette tape, with the audio on a first channel and the associated computer program on a second channel. A second such application uses a single channel cassette tape, with the audio interspersed between related portions of the computer program. A third such application uses a floppy disk in conjunction with a cassette tape, with the disk providing a computer program and the tape providing synchronized instructional narrative. In all three applications, the student listens to recorded instructional narrative while watching written information or graphics on a monitor screen. At predetermined points within a given lesson, the computer program turns off the tape player so that a student can answer a question concerning certain instructional material which has been presented. Following a student response, the computer program turns on the tape player for additional audio and textual instruction.

In all of the above cassette applications, the audio channel provides only positive reinforcement when a student response is correct, while all remediation resulting from an incorrect response is presented in written or graphics form on the monitor screen. Ideally, any computer-aided instructional lesson should provide branching, so that remedial instruction, as well as positive reinforcement, can be presented both audibly and visually when the student makes a response.

SUMMARY OF THE INVENTION

Accordingly, it is a primary object of the present invention to provide a computer-assisted audio/visual teaching system which includes a microcomputer, television monitor, audio control module, headphones, plural channel cassette player, plural channel audio cassette tape, disk drive or computer cassette recorder, and magnetic disk or program cassette tape for presenting audio/visual instructional material to an individual student, whereby the instructional material, including positive reinforcement and remedial material, is presented audibly as well as visually.

A further object of the present invention is to provide a computer-assisted audio/visual teaching system in which an audio control module controls the audio portion of audio/visual instructional material in synchronization with visual material presented by an associated microcomputer.

An additional object of the present invention is to provide a computer-assisted audio/visual teaching system in which an audio control module further provides a headphone jack for private listening to instructional narrative reproduced by an associated plural channel (stereo) tape player.

Another object of the present invention is to provide a computer-assisted audio/visual teaching system in which an audio control module provides an audio input jack, allowing sound effects of an associated computer to be coupled with recorded instructional narrative reproduced by a stereo tape player and head through student headphones.

A further object of the present invention is to provide a computer-assisted audio/visual teaching system in which an audio control module automatically energizes an associated stereo tape player in response to control signals initiated by a computer program and transmitted via a light-sensing probe attached to the screen of an associated television monitor, via a computer output port, or via a computer-generated tone.

An additional object of the present invention is to provide a computer-assisted audio/visual teaching system in which an audio control module automatically de-energizes an associated stereo tape player in response to control tones recorded on one channel of a 2-channel instructional tape which is reproduced by an associated stereo tape player.

A further object of the present invention is to provide a computer-assisted audio/visual teaching system in which an audio control module distributes a first or second channel of recorded instructional material, reproduced by an associated stereo tape player, to present either positive reinforcement or remedial material, depending upon a student's response typed into an associated microcomputer.

Another object of the present invention is to provide a computer-assisted audio/visual teaching system which further includes a power control module for controlling the power supply to an associated stereo player which does not have a remote control jack. Additional advantages and features of the present invention will be apparent from the following description of a preferred embodiment of the invention.

A preferred embodiment of the present invention provides an audio control module and a power control module which are connected to a cooperating microcomputer and stereo tape player for presenting audio/visual instructional material to an individual student. The visual portion of an instructional lesson is provided on a magnetic disk or program cassette tape and is loaded into the computer prior to beginning the lesson. The audio portion of the lesson is provided on a 2-channel cassette tape which is reproduced by a stereo tape player as the lesson progresses and is synchronized with the computer program. Thus, visual material is presented via a cooperating television monitor, and audio material is presented via headphones which are plugged into the above-mentioned audio control module. Since most inexpensive stereo players do not contain a remote control jack, the power control module is provided to control power to the player.

Following a predetermined segment of instructional material which has been presented both audibly and visually to a student, the tape player is stopped by control tones which have been recorded on the audio tape. This allows the student to respond by typing in an answer to a question or problem using the computer's keyboard. Following an incorrect response, the computer program actuates the tape player to continue the lesson, at which point the student receives remedial material both audibly and visually. If a response is correct, the tape player is again actuated, but the audio control module switches to a second channel to audibly present positive reinforcement which is also visually presented by the computer program. The above-described actuation of a tape player and audio channel selection are initiated by a computer program and transmitted via control signals from the computer's output port, from a computer-generated tone, or from a light-sensing probe which is attached to the screen of a cooperating television monitor. The audio control module provides an audio input jack, allowing computer-generated sound effects to be coupled to an audio output which the student hears through headphones.

BRIEF DESCRIPTION OF THE DRAWINGS

FIG. 5 is a schematic diagram showing an actuation mode switch, light-sensing probe input circuit, light-sensing probe, actuation gate, computer port input circuit, suction cup induction coil, computer sound effects input circuit, and sound effects amplifier of the audio control module of the present invention.

FIG. 6 is a side view showing the light-sensing probe of the present invention attached to the screen of a television monitor.

DESCRIPTION OF THE PREFERRED EMBODIMENT

Figure 1:
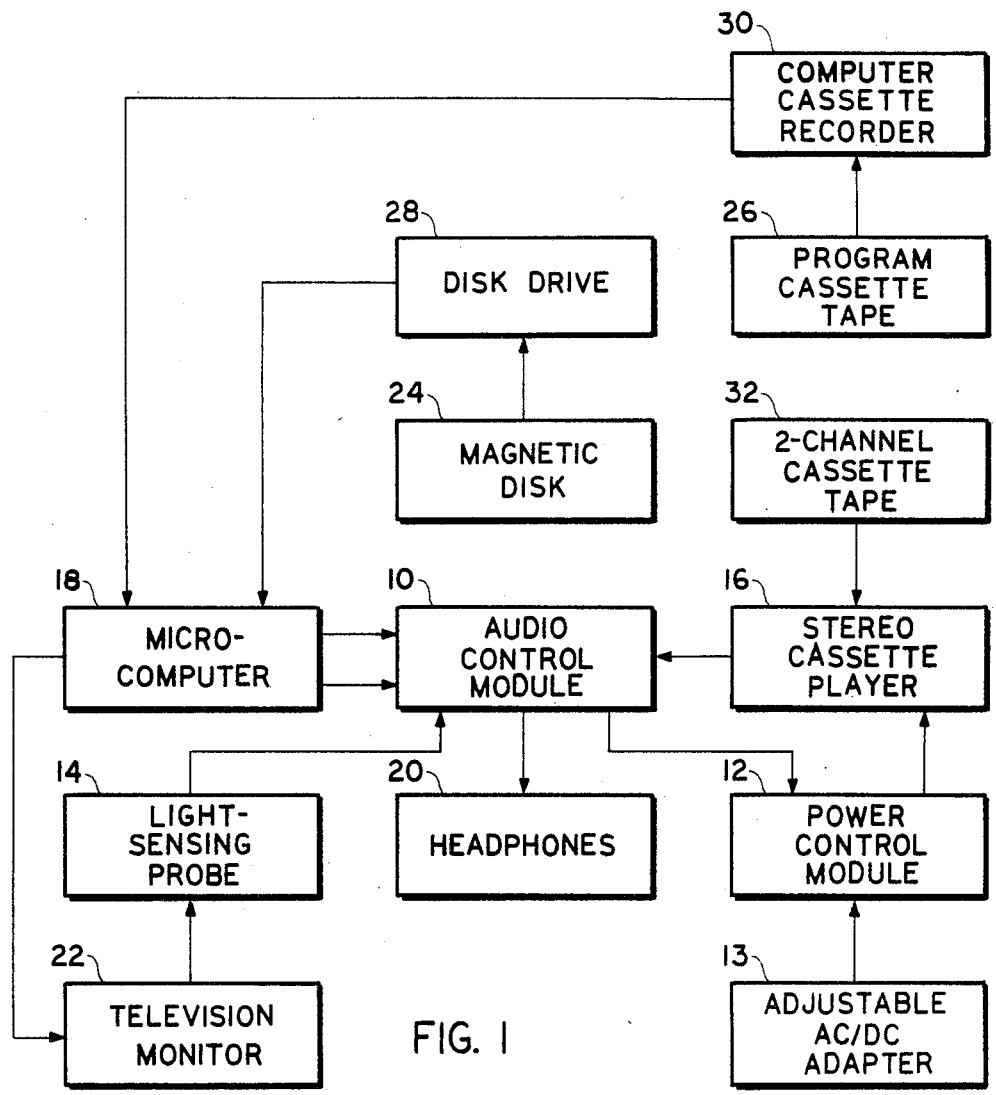
FIG. 1 is a block diagram of a computer-assisted audio/visual teaching system of the present invention.

Referring to FIG. 1, a block diagram containing the main elements of a computer-assisted audio/visual teaching system is shown. The diagram will be used to briefly describe the teaching system which is comprised of standard classroom components, except for an audio control module 10, power control module 12, and light-sensing probe 14. As previously described, a stereo cassette player 16 and a microcomputer 18 are used to present audio/visual instructional material to a student via headphones 20 and television monitor 22.

The computer portion of an instructional lesson is contained on a rigid or flexible disk 24 or on a program cassette tape 26 and loaded into a microcomputer 18, via a disk drive 28 or computer cassette recorder 30, prior to beginning the lesson. The audio portion of a lesson is recorded on a 2-channel cassette tape 32 and is reproduced by a stereo cassette player 16. Since most inexpensive stereo cassette players do not contain a remote control jack which allows the player to be turned on and off by a remote switch, a power control module 12 is provided for this purpose.

Power control module 12 contains a coaxial power jack, allowing it to receive power via an AC adapter 13 which is plugged into a 120 VAC wall outlet. A "universal" AC adapter can be used, thus providing 3, 4.5, 6, 7.5, or 9 volts DC, which is compatible with any inexpensive stereo cassette player. Batteries are removed from the player, and the power control module is plugged into the player's external power jack via a short cord and coaxial power plug. The power output of module 12 is remotely switched on and off by audio control module 10 when a miniature plug of module 10 is plugged into a miniature jack provided in the housing of power control module 12.

The audio output of stereo cassette player 16 is connected to audio control module 10 via a 3-conductor cord and plug, allowing a student to listen via monaural headphones 20. The visual portion of an instructional lesson is presented by a computer 18 which has its video output connected to a television monitor 22. At the beginning of each lesson, 2-channel cassette tape 32 is completely rewound to the beginning in order to synchronize the audio tape with a computer program. Audio control module 10 contains circuitry which causes power control module 12 to actuate stereo cassette player 16 in response to control signals from a light-sensing probe 14 which is attached to the screen of television monitor 22 or in response to control signals from the computer's output port or from computer-generated tones.

The above-mentioned control signals are initiated by the computer at preselected points within its computer program and may consist of POKE or PRINT commands. Audio control module 10 contains two miniature jacks for connecting light-sensing probe 14 or a cable from the computer output port. A third jack is provided in the audio control module housing to connect a sound output from computer 18 to the module so that computer-generated control tones can be received or desired computer-generated sound effects can be mixed with the audio output of stereo cassette player 16.

An instructional lesson is begun by running the computer program which was previously loaded by disk drive 28 or computer cassette recorder 30. Subsequently, stereo cassette player 16 is automatically actuated by control signals initiated by the computer program, and the student is presented with audio material via headphones 20 and visual material via television monitor 22. Following presentation of a predetermined segment of instructional material, recorded tones on 2-channel cassette tape 32 cause player 16 to switch off. As with the actuation control signals, audio control module 10 contains circuitry responsive to the above-mentioned recorded tones, causing player 16 to turn off. At this point, the student must type, via the computer keyboard, a response to a question or problem posed by the lesson in order to continue. Following a student response, the computer program resumes running, and control signals are initiated to again actuate player 16.

If a student response is correct, positive reinforcement is heard via monaural headphones 20 and seen via television monitor 22. If a student response is incorrect, remedial material is presented by the headphones and TV monitor. The above process is repeated as subsequent segments of a lesson are presented. To enhance the lesson, various computer sound effects may be generated to accompany various text or graphics presented on the monitor screen or to emphasize correct or incorrect student responses.

Figure 2:
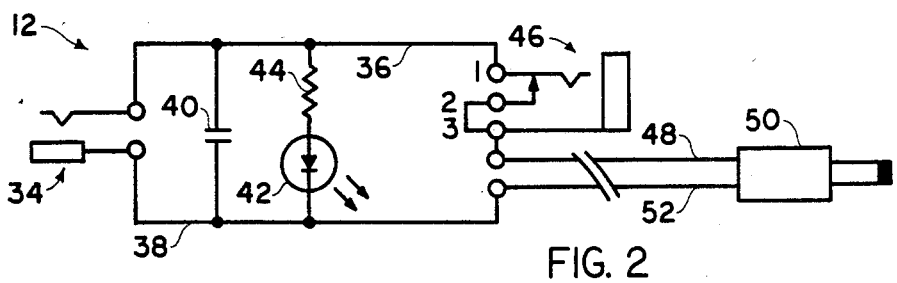
FIG. 2 is a schematic diagram of a power control module of the present invention.

Referring next to FIG. 2, a schematic diagram of power control module 12 is shown. The module is used to provide switching to the power circuit of an inexpensive stereo cassette player which does not have a remote control jack. Power is provided to module 12 by a "universal" AC adapter 13 which is plugged into a 120 VAC wall outlet and which selectively provides 3, 4.5, 6, 7.5, or 9 volts DC via an electrical cord terminated in a coaxial power plug (not shown). The AC adapter is connected to module 12 via a coaxial jack 34, providing +V on line 36 and ground on line 38. To filter rectified current from AC adapter 13 and further attenuate 60-cycle hum, a large electrolytic capacitor 40 is connected across lines 36 and 38. A power-on indicator light-emitting diode (LED) 42 is also connected across the abovementioned leads via a current limiting resistor 44. Positive line 36 is connected to terminal 1 of a closed-circuit miniature jack which serves as tape player control input 46 and, when no plug is present in the jack, +V is conducted to terminals 2 and 3 (which are jumpered) and line 48 to the outside sleeve of a coaxial plug 50. Ground line 38 is connected, via line 52, to the ground terminal of coaxial plug 50.

With this arrangement, when AC adapter 13 is plugged into a wall outlet and its associated coaxial plug is inserted into jack 34, power-on LED 42 is illuminated, and power control module 12 supplies power to a stereo cassette player when coaxial plug 50 is inserted into the player's external power jack. Proper voltage of the AC adapter should, of course, be selected to be compatible with the cassette player being used. For example, if 4 AA cells are normally used to power the player, the adapter voltage should be set at 6 volts. Without a plug in tape player control input 46, the cassette player will operate normally in any mode, but insertion of a miniature plug from audio control module 10 (FIG. 4) disconnects terminal 2 of input jack 46, allowing the cassette player's power circuit to be remotely controlled by switching circuitry contained within audio control module 10.

Figure 3:
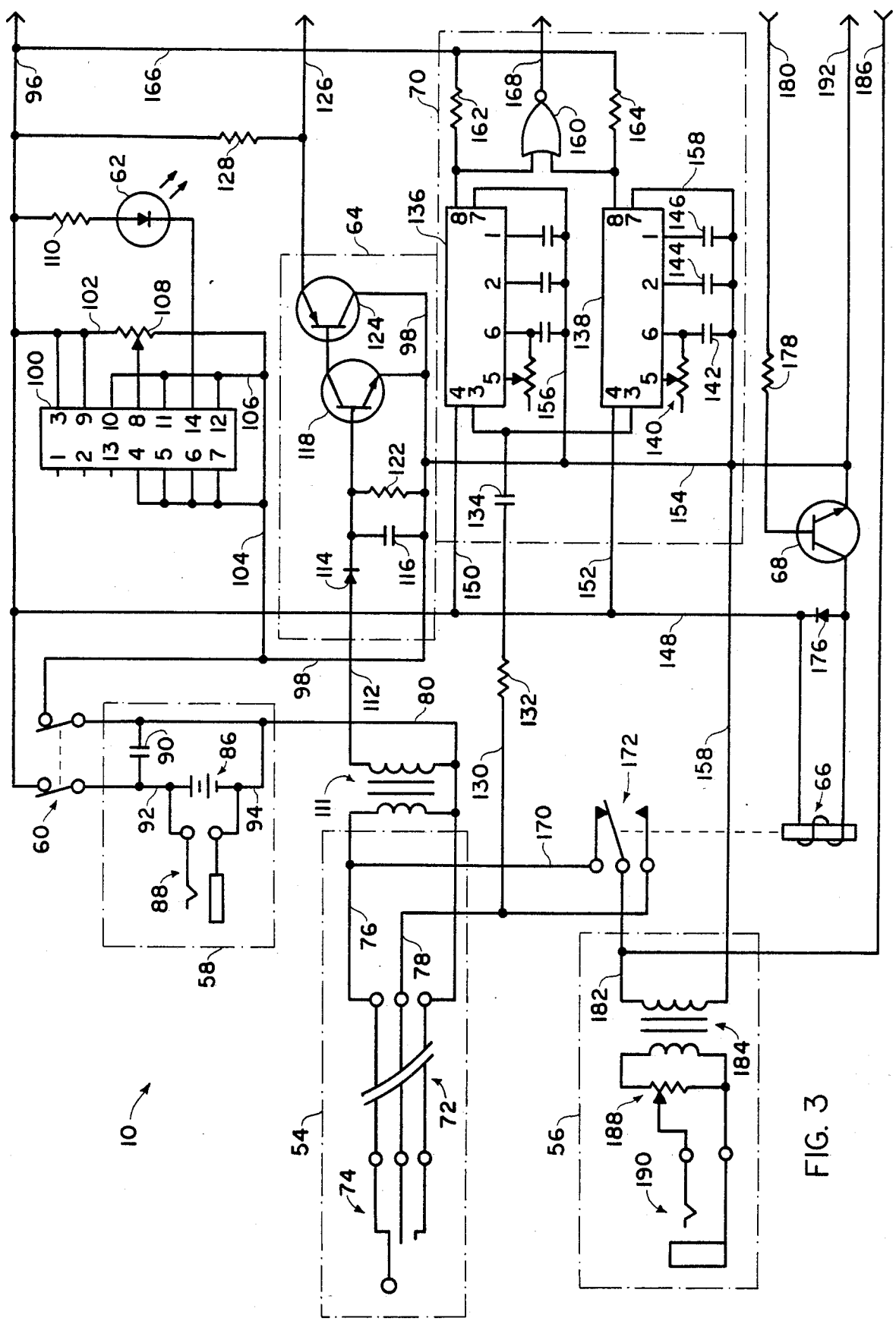
FIG. 3 is a schematic diagram showing an audio input circuit, audio output circuit, battery and recharge circuit, power switch, low battery indicator, sound-actuated switch, audio relay, audio relay driver transistor, and recorded tone receiver circuit of the audio control module of the present invention.

Referring now to FIG. 3, a schematic diagram is shown of an audio input circuit 54, audio output circuit 56, battery and recharge circuit 58, power switch 60, low battery indicator LED 62, sound-actuated switch 64, audio relay 66, audio relay driver transistor 68, and tone receiver circuit 70 of audio control module 10. As the name implies, the audio control module controls the audio portion of an instructional lesson. Briefly, the audio control module turns on an associated stereo cassette player in response to a single actuation control signal from either a light-sensing probe, computer output port, or computer-generated tone, causing a first (left) channel of a 2-channel cassette tape to be distributed; turns off the cassette player in response to control tones recorded on a second (right) channel of the cassette tape; turns on the cassette player and switches from a first (left) audio channel to a second (right) audio channel in response to a double actuation control signal, causing the second channel of a 2-channel lesson tape to be distributed; switches from a second audio channel to a first audio channel in response to a brief period of silence on the first audio channel, causing the first channel of a 2-channel lesson tape to be distributed; mixes computer-generated sound effects with audio from a 2-channel lesson tape; and provides an audio output heard by a student through monaural headphones.

The audio input circuit 54 of audio control module 10 is connected to a stereo cassette player 16 (FIG. 1) via a short length of 3-conductor cable 72 with attached 3-conductor plug 74, which is plugged into the player's headphone jack. The tip of plug 74 conducts the player's left audio channel to line 76. The right audio channel is conducted by the ring of plug 74 and appears on line 78. Ground is conducted by the plug's sleeve and appears on line 80.

Battery and recharge circuit 58 is comprised of a 5-cell, 6.25 V nickel cadmium battery 86, a coaxial power jack 88 which is connected in parallel with the battery, allowing battery recharge when voltage drops below a predetermined level, and a bypass capacitor 90 which is connected across +V line 92 and ground lines 94 and 80. A 2PST toggle switch serves as power switch 60 for the audio control module and disconnects both battery terminals in the open position. In the closed position (as shown), +V appears on line 96 and ground on line 98. The ground side of the power supply is simultaneously switched to prevent a student from hearing an output from audio output circuit 56 unless power switch 60 is closed and audio control module 10 is powered.

A low battery indicator LED 62 is provided to alert students or instructor when battery 86 drops below a preset level and is in need of recharging. The LED is controlled by a 339 linear quad voltage comparator 110. The comparator receives +V via lines 96 and 102, and pin 3. Ground is provided via lines 98, 104, and 106, and pin 12. One of the four noninverting comparator inputs (pin 9) is used as the sample voltage input, and is connected to +V via lines 96 and 102. The associated inverting input (pin 8) is used as a reference voltage input, and is connected to the wiper of a trimmer potentiometer 108. The resistive element of potentiometer 108 is connected between +V and ground, allowing the input threshold trip voltage (reference voltage) to be set to a predetermined level. Remaining unused comparator inputs are grounded. Since battery 86 is, in this example, 6.25 volts, potentiometer 108 is adjusted so that the output of the active comparator (pin 14) drops to a logical "0" voltage level when the sample battery voltage on pin 9 is at 5.8 volts or less. At this level, the battery needs to be recharged. The comparator output on pin 14 is connected to the cathode of low battery indicator LED 62; the LED anode is connected to +V via a current limiting resistor 110 to limit current drain to about 10 mA when the LED is illuminated in response to a low battery condition. The LED will, of course, briefly flash when power switch 60 is opened or closed, but the battery is not recharged unless the LED is constantly illuminated.

An audio transformer 111 couples the left channel audio appearing on line 76 with line 112 which, in turn, conducts left channel audio to a sound-actuated switch 64. The audio signal is rectified by a silicon diode 114 and filtered by a capacitor 116 which converts the analog left channel input to a logical "1" digital output appearing at the base of an NPN transistor 118. Ground line 98 serves as a common ground for components of sound-actuated switch 64. A pull-down resistor 122 is connected between the base of transistor 118 and ground line 98 to provide a quiescent logical "0" voltage unless sound is present on line 112.

The collector of transistor 118 is connected to the base of a PNP transistor 124; the emitter of transistor 118 is connected to ground line 98. With this arrangement, transistor 118 conducts during the presence of left channel sound which, in turn, biases transistor 124 into conduction. Since the collector of transistor 124 is connected to ground line 98, a logical "0" voltage appears at the transistor's emitter and line 126 in response to left channel sound. As can be seen, transistor 118 inverts the rectified left channel audio signal, and transistor 124 further amplifies and switches it. The output of sound-actuated switch 64 on line 126 is used to trigger a retriggerable timer which will be later described with reference to FIG. 4. A pull-up resistor 128 is connected between line 126 and +V line 96 to maintain a quiescent positive voltage on line 126 unless left channel audio is present on line 112.

Right channel audio appearing on line 78 is conducted, via line 130 and attenuation resistor 132, to the input capacitor 134 of tone receiver circuit 70. As previously described, control tones are recorded on the right channel of a 2-channel cassette tape 32 at predetermined points during an instructional lesson to stop stereo cassette player 16, so that a student can respond to questions or problems which are posed by the lesson. By using recorded control tones to stop cassette player 16, instructional narration can be of varying lengths without the need to accurately calculate various computer delay loops, which would be necessary if the computer program were used to de-energize the tape player at the end of any given narration. To assure accuracy of tones recorded on the tape's right channel, a crystal-controlled Motorola MC14410 2-of-8 tone encoder (not shown) is used as a tone generator. The tone generator is capable of providing dual tone multi-frequency (DTMF) signals in any one of 16 possible tone-pair combinations which, for this example, can be 697 and 1477 Hz.

Tone receiver circuit 70 provides two 567 phase locked loops (PLL's) 136 and 138 which function as tone decoders and which are responsive to the recorded DTMF signals. The 567 integrated circuit includes a current-controlled oscillator, phase detector, amplifier, quadrature phase detector, and power output stage. When a recorded control tone falls within the center frequency of the PLL's current-controlled oscillator, the quadrature phase detector drives its associated power output stage on. A variable resistor 140 and a small capacitor 142 determine the PLL's center frequency, which is selected to be 1477 Hz, for example. A low pass filter capacitor 144 sets the detection bandwidth, and an output filter capacitor 146 sets the band edge of the PLL's low pass filter. Phase locked loops 136 and 138 receive +V via lines 96, 148, 150, and 152, and pin 4, and ground via lines 98, 154, 156, and 158, and pin 7. The PLL output appears at pin 8 of each 567 and is conducted to the first and second inputs of a 4001 NOR gate 160, which serves as a negative logic NAND, providing a logical "1" voltage when recorded DTMF signals of 697 Hz and 1477 Hz are simultaneously decoded. Pull-up resistors 162 and 164 are connected between +V line 166 and the inputs of NOR gate 160 to provide a quiescent logical "1" voltage when no recorded DTMF tones are present on right channel line 130. The output of NOR gate 160 on line 168 is used to control a commutation relay which will later be described with reference to FIG. 4. It should be noted that a standard, crystal-controlled DTMF receiver, such as a Teltone M-957, can be used in place of the above two 567 phase locked loops.

Left channel audio input on line 76 is also conducted on line 170 to a first fixed terminal of the SPDT contacts 172 of a sensitive relay serving as audio relay 66. Right channel audio input on line 78 is additionally conducted to a second fixed terminal of contacts 172 of relay 66. Relay 66 receives +V on line 148 and ground via the collector of an NPN audio relay driver transistor 68 and line 154 which is connected to the transistor's emitter. To protect the driver transistor from inductive voltage spikes, a silicon diode 176 is connected across the relay coil. Relay driver transistor 68 is biased into conduction, via a resistor 178 and line 180, in response to a double actuation control signal which will be further described with reference to FIG. 4.

Unless relay driver transistor 68 is conducting, left channel audio input on lines 76 and 170 is conducted to the wiper of audio relay contacts 172 and appears on line 182 which, in turn, is connected to the positive terminal of the primary coil of an audio output transformer 184 of audio output circuit 56. When relay driver transistor 68 is conducting, right channel audio input on line 78 is conducted, via the wiper of audio relay contacts 172, to line 182. In addition, sound effects line 186 is connected to line 182, thus allowing computer-generated sound effects to be mixed with the recorded audio output. As will later be described with reference to FIG. 7, the left audio channel carries narration, questions, problems, and remediation for an instructional lesson; narration, DTMF control tones, and positive reinforcement are carried on the right channel. Computer sound effects can be provided regardless of which channel is being distributed by audio output circuit 56. The computer sound effects input and amplifier will later be described with reference to FIG. 5.

Audio output circuit 56 consists of an audio output transformer 184, a volume control potentiometer 188, and a monaural headphone jack 190. Student headphones are plugged into jack 190, and potentiometer 188 is adjusted by the student to provide a desired sound level. In summary, audio output circuit 56 provides a processed audio output of stereo cassette player 16 (FIG. 1) and any sound effects generated by a microcomputer 18 (FIG. 1).

Figure 4:
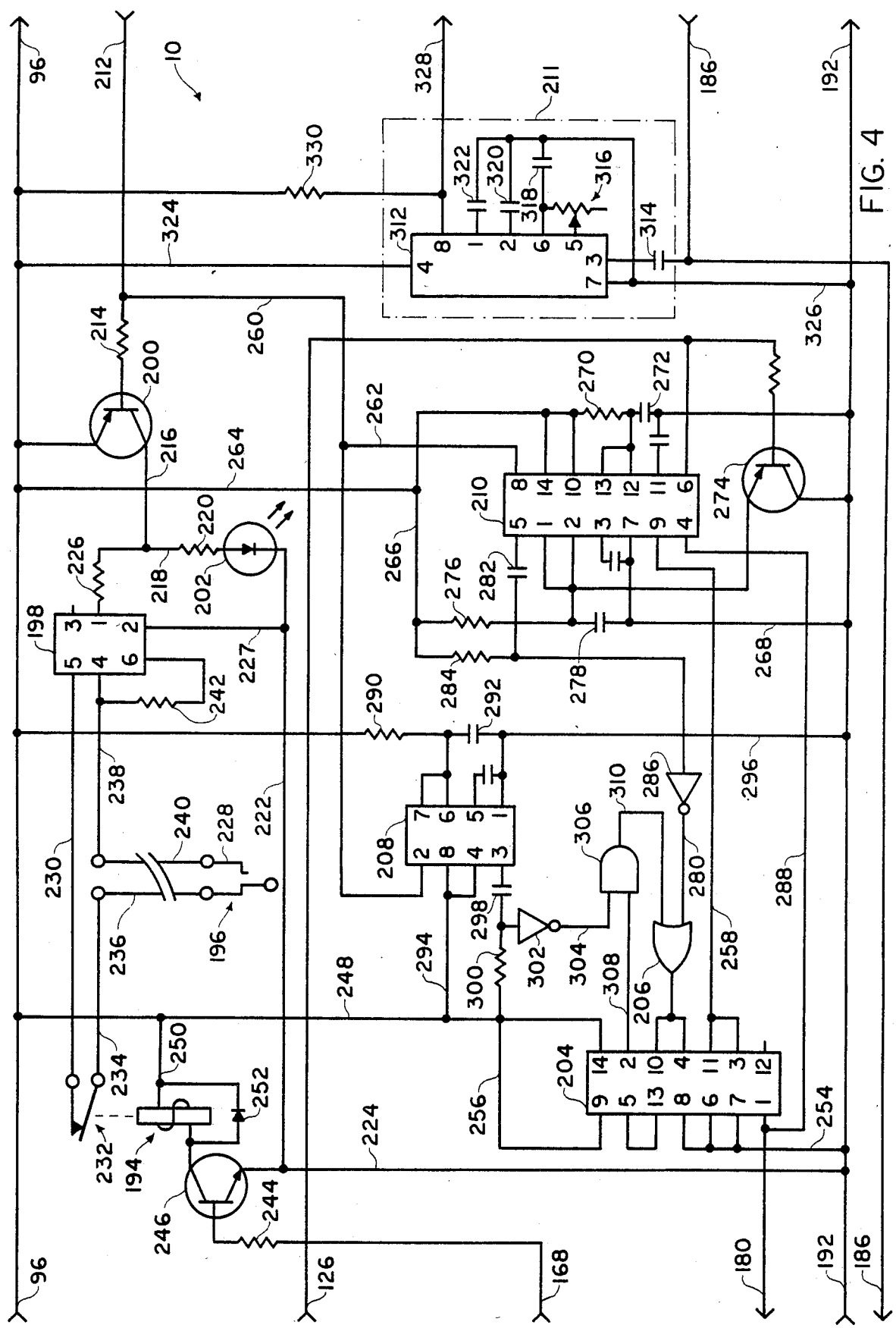
FIG. 4 is a schematic diagram showing a commutation relay, tape player control output, tape player control SCR, trigger transistor, trigger indicator LED, shift register, reset gate, single timer, dual timer, and computer tone receiver circuit of the audio control module of the present invention.

Referring next to FIG. 4, a schematic diagram is shown of a commutation relay 194, tape player control output 196, tape player control SCR 198, trigger transistor 200, trigger indicator LED 202, shift register 204, reset gate 206, single timer 208, daul timer 210, and computer tone receiver circuit 211 of audio control module 10. As has been previously described, actuation control signals from a light-sensing probe 14 attached to the screen of a television monitor 22, from the output port of a microcomputer 18, or from a computer-generated tone are used to actuate a stereo cassette player 16 (FIG. 1) at preselected points within a computer program during the course of an instructional lesson. When an actuation control signal occurs, a brief logical "0" pulse is present on line 212. As seen in FIG. 4, line 212 is connected, via a bias resistor 214, to the base of a PNP trigger transistor 200. The transistor is used to invert and amplify the above-mentioned control signal which, in turn, simultaneously illuminates a trigger indicator LED 202 and triggers a photo silicon controlled rectifier (SCR) 198 into conduction. The emitter of transistor 200 is connected to +V line 96; the transistor's collector is connected, via line 216, to a trigger bus 218, thereby conducting a logical "1" voltage to bus 218 in response to actuation control signals from a monitor screen, computer port, or computer tone.

Bus 218 is connected, via a current limiting resistor 220, to the anode of a light-emitting diode which serves as trigger indicator LED 202. The cathode of LED 202 is connected to ground via lines 222, 224, and 192. Bus 218 is also connected, via a current limiting resistor 226, to the anode (pin 1) of a gallium arsenide infrared diode of an H11C3 photo SCR optoisolator which functions as tape player control SCR 198. The diode's cathode (pin 2) is connected to ground via lines 227, 222, 224, and 192. A photo SCR optoisolator is used here to isolate the power circuit of a cassette player from the power circuit of audio control module 10. Both current limiting resistors 220 and 226 are selected to limit diode current consumption to about 10 mA when the diodes are simultaneously illuminated in response to conduction of trigger transistor 200. The purpose of trigger indicator LED 202 is to verify for the instructor that actuation control signals from a computer output port, from a light-sensing probe, or from a computer-generated tone are being received by audio control module 10 and that light-sensing probe 14 is properly positioned on the screen of an associated television monitor (FIG. 6), or that computer tone receiver circuit 211 is properly tuned to the tone being used.

The infrared diode of tape player control SCR 198 is optically coupled with a photo SCR, the SCR's anode appearing at pin 5 and the cathode at pin 4. The SCR's anode is, in turn, connected to the tip of a miniature plug 228 of tape player control output 196 via line 230, normally closed contacts 232 of commutation relay 194, line 234, and line 236. The cathode of SCR 198 is connected to the sleeve of plug 228 via lines 238 and 240. When plug 228 is inserted into jack 46 of power control module 12 (FIG. 2), SCR 198 provides switching control to the output of power control module 12 and power circuit of a stereo cassette player 16 (FIG. 1) which is connected to power control module 12 via power plug 50 (FIG. 2). Lines 236 and 240 are provided by a short length of 2-conductor electrical cord which is terminated in miniature plug 228. Subsequent to being triggered by trigger transistor 200, tape player control SCR 198 functions as a "latching relay" to conduct power to the cassette circuit until the SCR is turned off by commutation relay 194. To prevent false or premature triggering, the SCR gate at pin 6 receives external gate-cathode resistance via a resistor 242 which is connected between pin 6 and line 238.

As was described with reference to FIG. 3, DTMF tones are recorded at predetermined points within one channel of a 2-channel cassette tape to automatically stop the stereo cassette player which is reproducing the tape. The DTMF tone pairs are detected and decoded by tone receiver circuit 70 (FIG. 3), with a resulting logical "1" output appearing on line 168. As seen in FIG. 4, line 168 is connected, via bias resistor 244, to the base of an NPN relay driver transistor 246, allowing the transistor to briefly conduct and energize commutation relay 194 during the presence of a DTMF tone pair. When transistor 246 conducts, relay 194 receives +V via lines 96, 248, and 250, and ground via lines 192 and 224, and the emitter-collector of transistor 246. A silicon diode 252 is connected across the coil of relay 194 to suppress inductive spikes. When the coil of commutation relay 194 is energized in response to recorded DTMF tones, contacts 232 are momentarily opened, causing SCR 198 to be commutated and stereo cassette player 16 to be turned off.

As also described with reference to FIG. 3, audio output circuit 56 provides an audio output for either the left or right channel of an associated stereo cassette player. A single actuation control signal from a light-sensing probe, computer output port, or computer tone actuates the cassette player, but not audio relay 66, permitting a student to hear only the left audio channel. A double actuation control signal (two closely spaced signals) actuates the cassette player and audio relay 66, allowing a student to hear only the right audio channel. Additionally, when any narration segment is completed on the left audio channel (which causes a period of silence), audio relay 66 is automatically de-energized, so that the left audio channel is again distributed by audio output circuit 56. Audio relay driver transistor 68 (FIG. 3) is controlled by a shift register 204, reset gate 206, single timer 208, and dual timer 210 which are shown in FIG. 4.

A double actuation control signal from either a light-sensing probe, computer output port, or computer tone twice triggers a first timer of dual timer 210, causing the timer to produce two brief and separate timing cycles. The timer is operated in a monostable mode and functions as a clock to twice clock a dual D flip-flop serving as shift register 204, causing the second stage Q2 output to go positive subsequent to the second clocking. The second stage Q2 output is connected to the base of audio relay driver transistor 68 (FIG. 3) which, in turn, conducts and energizes audio relay 66, causing the audio output to switch from the left to right channel.

Instructional narration recorded on the left audio channel is converted to negative pulses by a sound-actuated switch 64 (FIG. 3) and is used to trigger a second timer of daul timer 210. The second timer is configured in a negative-recovery monostable (retriggerable) mode and has its output connected to an inverting negative edge detector, which provides a brief positive pulse when the timer drops to a logical "0" in response to a period of silence on the left audio channel. The edge detector output is, in turn, conducted through a reset gate 206 to the reset pins of shift register 204, causing the register to be reset in response to momentary silence on the left audio channel. At this point, audio relay 66 (FIG. 3) is turned off, causing the audio output to switch from the right channel to the left channel.

To reset shift register 204 following a single actuation control signal (which does not actuate audio relay 66) from a light-sensing probe, computer port, or computer tone, a single timer 208 which is operated in a monostable mode is simultaneously triggered by the control signal. The output of timer 208 is connected to a second inverting negative edge detector which is also used, via reset gate 206, to reset shift register 204 when timer 208 drops to logical "0" at the end of its timing cycle. To prevent reset by timer 208 when the audio output is switched to the right channel, the output of the above-mentioned second edge detector is inhibited when audio relay 66 is energized.

The 4013 dual D flip-flop serving as shift register 204 receives +V via lines 96 and 248, and pin 14. Ground is received through lines 192 and 254, and pin 7. Since the flip-flop is used in a clocked mode, direct set inputs at pins 6 and 8 are grounded via line 254. To allow the flip-flop to function as a shift register, the Q1 output of the first flip-flop at pin 13 is connected to the D2 input of the second flip-flop at pin 5. Since the D1 input (pin 9) of the first flip-flop is tied high via line 256, the positive edge of a first clock pulse drives Q1 high, and, since Q1 is connected to D2, a second clock pulse drives Q2 high. Thus, a positive data input on the first flip-flop is "shifted" to the second flip-flop by two clock pulses. As has been described, the Q2 output of the second flip-flop appears on line 180 which is connected, via a bias resistor 178, to the base of audio relay driver transistor 68 and, thus, energizes audio relay 66 (FIG. 3) when Q2 is positive.

The two clock inputs at pins 11 and 3 of shift register 204 are connected, via line 258, to the output (pin 9) of a first timer of a 556 dual timer 210. This timer, as above-described, functions as a clock for shift register 204 and clocks the register each time the timer is triggered at pin 8 by a logical "0" actuation control signal appearing on lines 212, 260 and 262. Dual timer 210 receives +V via lines 96, 264, and 266, and pin 14. Ground is received through lines 192 and 268, and pin 7. A timing resistor 270 and a timing capacitor 272 are selected to produce a 1.5-second timing cycle for the first timer. Since an actuation control signal appearing on line 262 and which triggers the first timer is approximately 1 second in duration, the timing cycle is selected to be slightly longer, i.e., 1.5 seconds. As soon as the first timer is triggered, its output is driven high and shift register 204 is positive-edge clocked via line 258.

A second timer of dual timer 210 utilizes an external PNP transistor 274 in a negative-recovery monostable configuration and has a timing resistor 276 and timing capacitor 278 which are selected to provide a 2-second timing cycle. This timer is used as a missing-pulse detector for the output on line 126 of sound-actuated switch 64 (FIG. 3). Once the timer is triggered at pin 6 by negative pulses resulting from narration recorded on the left channel of 2-channel cassette tape 32 (FIG. 1), the timer output remains high until a period of silence exceeding two second occurs. When silence does occur, the timer output on pin 5 drops to logical "0," causing a brief logical "1" voltage to be generated on line 280 by a first inverting negative edge detector consisting of a capacitor 282, a pull-up resistor 284, and a 4584 Schmitt trigger inverter 286. Line 280 is, in turn, connected to a first input of a 4071 2-input OR serving as reset gate 206. With this arrangement, shift register 204 is reset when narration on the left audio channel ceases for a period exceeding two seconds.

To prevent premature reset of shift register 204, which can occur from spurious sound on the left audio channel (such as a momentary "pop" when associated tape player 16 is actuated), the reset (pin 4) of the negative-recovery timer is connected, via line 288, to line 180 which is high only when two clock pulses have been received by shift register 204 and audio relay 66 is energized. Thus, the negative-recovery timer is inhibited by a logical "0" voltage on reset pin 4 until two clock pulses have been received by shift register 204, causing pin 4 to go high. Reset pin 10 of the first timer of dual timer 210 is tied high via line 266, and the control voltage inputs (pins 3 and 11) of both timers are bypassed to ground by small capacitors.

In order to reset shift register 204 when only one control signal is received on line 260 (as when it is desired to actuate stereo cassette player 16 but not switch to the right audio channel), a single 555 timer 208 is provided. Timer 208 is used, as above-described, as a monostable and has a timing cycle of about 4 seconds, as determined by a timing resistor 290 and a timing capacitor 292. The time delay is chosen to prevent reset of shift register 204 before two actuation control signals have had a chance to clock the register when it is desired to switch from the left to right audio channel. If only one control signal is received, the shift register is automatically reset at the end of the timer's 4-second cycle.

Single timer 208 receives +V on lines 96, 248, and 294, and pin 8. Ground is provided on lines 192 and 296, and pin 1. The timer's reset input (pin 4) is tied high via line 294, and the control voltage input (pin 5) is bypassed to ground via a small capacitor. Any actuation control signals appearing on line 260 are conducted to the timer trigger at pin 2. The timing output appears at pin 3 and is conducted to a second inverting negative edge detector consisting of a capacitor 298, a pull-up resistor 300, and a 4584 Schmitt trigger inverter 302. At the end of the timer's 4-second timing cycle, pin 3 goes low, causing a brief positive pulse to be generated on line 304 which is, in turn, conducted to a first input of a 4081 2-input AND gate 306. The second input of AND gate 306 is connected, via line 308, to the $\overline{Q2}$ output (pin 2) of the second stage of shift register 204. Since $\overline{Q2}$ is low when Q2 (pin 1) is high, AND gate 306 prevents the transmission of a reset pulse from single timer 208 when shift register 204 has received a double actuation signal. If only one actuation control signal has been received, however, the reset pulse is transmitted on line 310 by gate 306 to a second input of reset gate 206, causing reset of shift register 204.

Also shown in FIG. 4 is a computer tone receiver circuit 211 which detects and decodes actuation control signals from a computer-generated tone. Since audio control module 10 is connected to the sound effects output of microcomputer 18, any one of the several sound effects tones can be used to turn on associated stereo cassette player 16. The tone selected to provide actuation control signals should not, however, be used in a lesson program to provide regular sound effects. Computer tone receiver circuit 211 includes a 567 phase locked loop 312 which has its input capacitor 314 connected to sound effects line 186. A 20 K-ohm variable resistor 316 and a 0.1 mfd capacitor 318 can be used to adjust the PLL's center frequency to any tone within a 550 Hz to 5.5 KHz range. As previously described, trigger indicator LED 202 can be used to tune the PLL, causing the LED to be illuminated when a selected computer sound effects tone is detected by the PLL.

A low pass filter capacitor 320 sets the detection bandwidth, and an output filter capacitor 322 sets the band edge of the PLL's low pass filter. PLL 312 receives +V via lines 96 and 324, and pin 4, and ground via lines 192 and 326, and pin 7. The PLL output appears at pin 8 and line 328. To maintain a quiescent positive voltage on line 328 when no selected computer tone is being detected, a pull-up resistor 330 is connected between output line 328 and +V line 96.

In summary: a single actuation control signal from light-sensing probe 14, output port of microcomputer 18, or selected sound effects tone of microcomputer 18 actuates an associated stereo cassette player 16 (FIG. 1), causing the left audio channel to be heard through audio output circuit 56 (FIG. 3); a double actuation control signal actuates player 16, causing the right channel to be heard through audio output circuit 56; a period of silence in narration recorded on the left audio channel of 2-channel cassette tape 32 (FIGS. 1 and 7) causes switching from the right audio channel to the left audio channel; and control tones recorded on the right channel of cassette tape 32 cause player 16 to turn off when the tones are detected.

Referring now to FIG. 5, a schematic diagram is shown of an actuation mode switch 332, light-sensing probe input circuit 334, light-sensing probe 14, actuation gate 336, computer port input circuit 338, computer sound effects input circuit 340, and sound effects amplifier 342 of audio control module 10. As was previously described with reference to FIG. 1, audio control module 10 actuates an associated stereo cassette player 16 in response to a computer program run by microcomputer 18. Three modes of actuation can be used: (1) actuation control signals generated by a light-sensing probe 14 which is attached to the screen of an associated television monitor 22, (2) actuation control signals generated directly by a microcomputer 18 and conducted from the computer's output port, via a connecting cable, to audio control module 10, and (3) actuation control signals generated in response to a selected sound effects tone generated by a microcomputer 18.

Light-sensing probe 14, as shown in FIG. 5, consists of a cadmium sulfide photocell 344 which has its terminals attached, via a short length of 2-conductor electrical cord 346, to a miniature plug 348. The photocell is affixed to the screen of a television monitor, as shown in FIG. 6, and plug 348 is inserted into a miniature jack 350 of light-sensing probe input circuit 334. Input circuit 334 consists of a jack 350, a filter capacitor 352, a variable resistor 354, a bias resistor 356, an NPN driver transistor 358, a 4N33 photo-Darlington optoisolator 360, and a pull-down resistor 362. Lines 96 and 364 provide +V which is conducted in a loop circuit, via the tip of plug 348, photocell 344, and the sleeve of plug 348 to control line 366 which is connected to the "ground" terminal of miniature jack 350. When a computer program executes a subroutine to print a dark square (if the computer display format is black-on-white) or a light square (if the computer display format is white-on-black) on an associated TV monitor screen, the resistance of photocell 344 increases when a dark square is detected and decreases when a light square is detected.

With the above arrangement, a small increase or decrease in voltage, as determined by the resistance of photocell 344, is amplified to provide an actuation control signal in response to a dark or light square displayed by a television monitor. Filter capacitor 352 is connected across the terminals of miniature jack 350 to attenuate 60-cycle hum produced by the monitor's vertical scan. Variable resistor 354 functions as a sensitivity control, and has its wiper connected to control line 366 and its resistive element connected to ground via lines 368, 370, and 192. Any actuation control signal appearing on line 366 is conducted, via bias resistor 356, to the base of an NPN transistor 358 which serves as a driver transistor for optoisolator 360. The collector of transistor 358 is connected to +V via lines 372 and 96. A positive control voltage on line 366 biases the transistor into conduction, causing +V to appear at the transistor's emitter which, in turn, is connected to the anode (pin 1) of gallium arsenide infrared diode of optoisolator 360. Since the working current applied to the diode does not exceed 10 mA, no current limiting resistor is needed between the emitter of transistor 358 and the infrared diode. The diode's cathode at pin 2 is connected to ground via lines 374, 368, 370, and 192.

Optoisolator 360, in which the above-mentioned infrared diode is optically coupled to a silicon planar photo-Darlington transistor, is used as an amplifier, rather than an optoisolator, in this application. A 4N33 photo-Darlington optoisolator was chosen because it has a current transfer ratio of 500% and, thus, functions as a high gain amplifier which is highly sensitive to small voltage swings on control line 366. The photo-Darlington's collector at pin 5 is connected to +V via lines 376 and 96. The transistor's emitter appears at pin 4 and is connected, via line 378, to a first input of a 4071 2-input OR which functions as actuation gate 336. A pull-down resistor 362, which is connected between emitter pin 4 and ground line 368, maintains a quiescent logical "0" on OR input line 378. Variable resistor 354 is adjusted so that a dark square displayed by television monitor 22, causing high resistance of photocell 344, produces a logical "0" voltage on output line 380 of actuation gate 336; a light square displayed by monitor 22, causing low resistance of photocell 344, produces a logical "1" voltage output on line 380.

Computer port input circuit 338 consists of a miniature jack 382, a current limiting resistor 384, and a photo-Darlington optoisolator 386. This input is provided to allow audio control module 10 to be directly connected to the output port of a microcomputer when it is more expedient not to utilize the above-described light-sensing probe. Input circuit 338 allows an associated stereo cassette player 16 to be actuated by logical "1" control signals conducted from a computer output port via a 2-conductor electrical cable (not shown) which is plugged into jack 382. The positive terminal of jack 382 is connected to a current limiting resistor 384 which, in turn, is connected to the diode anode (pin 1) of a 4N33 photo-Darlington optoisolator 386. The jack's negative terminal is connected to the diode cathode at pin 2. In this application, optoisolator 386 is used to electrically isolate audio control module 10 from microcomputer 18.

Current limiting resistor 384 of computer port input circuit 338 is selected to limit current to the optoisolator infrared diode to about 10 mA at 5 volts. The collector (at pin 5) of the optoisolator's optically coupled photo-Darlington transistor is connected to +V via line 96; the emitter (pin 4) is connected, via line 388, to a second input of actuation gate 336. A pull-down resistor 390 is connected between gate input line 388 and ground line 368 to provide a quiescent logical "0" on line 388. When it is desired to actuate stereo cassette player 16, a subroutine of a computer program of microcomputer 18 causes the computer to output a logical "1" pulse which is conducted, via an electrical cable and jack 382, to the infrared diode of optoisolator 386. The optically coupled photo-Darlington of optoisolator 386, in turn, provides a logical "1" pulse, via line 388, to a second input of actuation gate 336. Output line 328 of computer tone receiver circuit 211 (as described with reference to FIG. 4) is inverted by a 4584 inverting Schmitt trigger 390 and connected, via line 392, to a third input of actuation gate 336. As with light-sensing probe 14 and computer port input circuit 338, a positive control signal is transmitted by actuation gate 336 to output line 380.

Control signals on line 380 are inverted by a first 4584 inverting Schmitt trigger 394 and conducted, via line 396, to terminal 1 of a SPDT toggle switch which serves as actuation mode switch 332. The control signal output of Schmitt trigger 394 is also conducted to a second inverting Schmitt trigger 398 and, in turn, to terminal 2 of mode switch 332. Actuation control signals subsequently appear at wiper terminal A and line 212. Schmitt inverters are included here to provide a nominal amount of hysteresis in the actuation control signal output when light-sensing probe 14 is used.

Actuation mode switch 332 is used in a first position (as shown) when actuation control signals are transmitted, via actuation gate 336, from a computer output port, computer-generated tone, or light-sensing probe (when the computer display format is white-on-black). The positive actuation control signal is inverted by inverter 394 and conducted, via mode switch terminals 1-A, to line 212. As was described with reference to FIG. 4, line 212 is connected to trigger transistor 200, causing tape player control SCR 198 to turn on in response to the actuation control signal. Line 260, which is connected to line 212, and line 262, which is connected to line 260, conduct the negative actuation control signal to the triggers of single timer 208 and a first timer of dual timer 210 which function as reset and clock, respectively, for shift register 204.

Actuation mode switch 332 is used in a second position when light-sensing probe 14 is used with a black-on-white computer display format. In this configuration, the actuation control signal is negative, rather than positive, and is re-inverted by second inverter 398. Inverter 398 is connected to terminal 2 of mode switch 332, causing the brief negative actuation control signal to be conducted, via switch terminals 2-A, to line 212 and the abovedescribed SCR and timers.

When mixing computer-generated sound effects with the audio output of audio control module 10, or when using a computer-generated tone as an actuation control signal, a sound cable is used to connect a computer audio output jack (if one is available) with a miniature input jack 400 of computer sound effects input circuit 340. If no computer audio output jack is available, but the computer does provide an internal speaker, a suction cup induction coil 402 can be attached to the computer housing in the vicinity of the speaker and plugged into jack 400. Suction cup induction coil 402 can also be used to couple computer sound effects with audio control module 10 which are available at the speaker of an associated television monitor. The terminals of jack 400 are connected to the primary coil of an audio input transformer 404 which serves to isolate audio control module 10 from an associated microcomputer 18 when a direct sound effects connection is made.

The secondary coil of audio transformer 404 is connected to the resistive element of a potentiometer which functions as a volume control 406 for sound effects amplifier 342. The wiper of potentiometer 406 is connected, via an input capacitor 408, to a preamplifier which consists of an NPN transistor 410, resistors 412, 414, and 416, and a capacitor 418. An additional small capacitor 420 is used to decouple the preamplifier from +V line 96 and ground line 192. An additional capacitor 422 couples the preamplifier output to the non-inverting input (pin 3) of an LM-386 low power amplifier which serves as sound effects amplifier 342. A resistor 424 limits the input gain of the amplifier which, in turn, is set at 200 by a capacitor 426 which is connected between pins 1 and 8. The amplifier's inverting input (pin 2) is shorted to ground via line 428, while lines 96 and 192 supply +V and ground at pins 6 and 4, respectively. The amplifier is bypassed to ground at pin 7 via a small capacitor 430; a capacitor 432 and resistor 434 form a series network from output pin 5 to ground to prevent unwanted RF oscillation.

The output of amplifier 342 appears at pin 5 and is then coupled, via a capacitor 436, to line 186 which is connected to the primary coil of audio output transformer 184 (FIG. 3). With this arrangement, sound effects from microcomputer 18 (FIG. 1) are amplified and mixed with the audio output from audio control module 10. Volume control 406 is selectively rotated to adjust the amplitude of computer-generated sound effects, so they are compatible with the existing audio level from an associated stereo cassette player 16 (FIG. 1).

As was described with reference to FIG. 4, a computer tone receiver circuit 211 is also connected to sound effects line 186, allowing one of the sound effects tones to serve as an actuation control signal to energize stereo cassette player 16. The sound effects tone selected for this purpose should not be used for regular sound effects and should be within the range of the receiver circuit, which, for this example, is within 550 Hz to 5.5 KHz.

Referring next to FIG. 6, a side view of light-sensing probe 14 of audio control module 10 is shown as it is attached to the screen of a television monitor 22. The housing of cadmium sulfide photocell 344 is affixed to a square piece of plastic 438 which, in turn, is affixed to a square piece of Velcro material 440. A mating piece of Velcro material 442 is attached to the screen 444 of a television monitor 22 via adhesive backing. The plastic and Velcro squares contain a circular cutout, as shown by dotted lines, allowing the sensitive surface of photocell 344 to be optically coupled with displayed dark or light squares 446 which provide actuation control signals to light-sensing probe input circuit 334.

With the above arrangement, an adhesive-backed Velcro square 442 can first be attached to monitor screen 444 in the lower right or left corner where control squares will be displayed. To facilitate mounting, a static control square is generated by the computer so that adhesive-backed Velcro square 442 can be exactly centered over the control square. The Velcro surface 440 of light-sensing probe 14 is then simply pressed against the mounted square 442 to securely attach the probe. After light-sensing probe 14 has been connected to audio control module 10, trigger indicator LED 202 (FIG. 4) is illuminated when probe 14 has been correctly positioned and actuation control signals are being received by audio control module 10 in response to dark or light control squares displayed by television monitor 22. It should be noted that, although television monitor 22 describes a conventional cathode ray tube (CRT) screen, light-sensing probe 14 can also be used with transmissive liquid crystal, gas plasma, electroluminescent, and vacuum fluorescent flat panel monitor screen.

Light-sensing probe 14 is used as a universal computer-to-audio control module interface to obviate differing interface connections required by different makes of computers. In the Apple IIe microcomputer, for example, output port actuation control signals can be obtained by utilizing one of four "annunciators" of the "Game I/O Connector" which is accessed by removing the housing cover to expose the main printed circuit board. The Game I/O Connector is a 16-pin DIP socket soldered to the computer's main board, and accepts a 16-pin header plug. By using a short length of 2-conductor cable attached to header plug pins 8 and 15 at one end and to the sleeve and pin terminals, respectively, of a miniature plug at the other end, the "zero" annunciator of the Game I/O Connector can be electrically connected to audio control module 10. The header plug is inserted into the Game I/O Connector, and the miniature plug is inserted into miniature jack 382 of computer port input circuit 338 (FIG. 5).

With the above arrangement, a computer program can be used to turn the zero annunciator "on" or "off" by sending header pin 15 high or low with respect to pin 8 which is computer ground. As previously described, a logical "1" voltage (annunciator "on") causes the infrared diode of optoisolator 386 (FIG. 5) to be illuminated and, thus, initiates an actuation control signal. To toggle the annunciator "on" for about 1 second for a single actuation control signal, a computer program can contain the following BASIC subroutine which is initiated by a "GOSUB" command:

710 POKE −16295,0
720 FOR I=1 TO 780: NEXT I
730 POKE −16296,1
740 RETURN

Statement 710 turns the annunciator "on"; statement 720 is a one-second time delay loop; statement 730 turns the annunciator "off"; and statement 740 returns the computer program to the first statement following the GOSUB command. The resulting single actuation control signal energizes stereo cassette player 16, allowing a student to hear instructional material recorded on the left channel of 2-channel cassette tape 32 (FIG. 1).

To twice toggle the annunciator "on" for a double actuation control signal, the GOSUB command is repeated:

1680 GOSUB 710
1690 FOR I=1 TO 780: NEXT I
1700 GOSUB 710

Statement 1680 causes the computer program to branch to the annunciator toggle subroutine; statement 1690 is a one-second time delay loop; and statement 1700 again causes the computer program to branch to the toggle subroutine. This time, the resulting double control signal actuates stereo cassette player 16, and allows a student to hear instructional material recorded on the right channel of 2-channel cassette tape 32.

As was above-stated, use of light-sensing probe 14 eliminates electrical connections between a computer output port and audio control module 10, allowing actuation control signals to be recovered from a cooperating television monitor screen. Since the Apple IIe, which is being used here as an example, has a white-on-black display format (light lettering on a dark background), mode switch 332 (FIG. 5) is used in the position shown. A light square is displayed in the lower right hand corner of monitor screen 444 (FIG. 6) by the following subroutine:

860 INVERSE:HTAB (39): VTAB (22): PRINT " "
870 FOR I=1 TO 780: NEXT I
880 NORMAL: HTAB (39): VTAB (22): PRINT " "
890 RETURN

Statement 860 prints a light square in the lower right corner of the monitor screen; statement 870 is a one-second delay loop; statement 880 prints a dark square in the same position as the light square, obliterating the light square; and statement 890 returns the program to the first statement following the GOSUB command. The resulting 1-second logical "1" voltage of light-sensing probe 14 illuminates the infrared diode of optoisolator 360 (FIG. 5) and initiates a single actuation control signal. To provide a double actuation control signal, the GOSUB command is repeated, as was above-described for the annunciator. Since light-sensing probe 14 covers an approximate 2 cm² portion of the lower right monitor screen, all instructional programs used with the probe are written so that no text or graphics is displayed within the probe area.

Instead of using a computer output port or light-sensing probe, a sound effects tone can provide the necessary actuation control signals. Again using the Apple IIe computer as an example, audio control module 10 is connected to the computer via a sound cable which is inserted into jack 400 of sound effects input circuit 340 and into the computer's "Cassette In" jack. Or audio control module 10 may be coupled with the computer via suction cup induction coil 402 which is positioned in the vicinity of the computer's speaker. In either case, the PLL of computer tone receiver circuit 211 is tuned to a selected tone by adjusting variable resistor 316 until trigger LED indicator 202 (FIG. 4) is illuminated in the presence of the tone. Once appropriate sound effects data have been poked into the computer memory, the following subroutine can be used to provide a single actuation control signal in response to a program "GOSUB" command:

820 POKE 768,60: POKE 769,200: CALL 770
830 RETURN

Statement 820 produces a tone of about 1 KHz which is approximately one second in duration. Statement 830 returns the computer program to the first statement following the GOSUB command. As was described concerning the computer output port and light-sensing probe, the resulting single actuation control signal energizes stereo cassette player 16, allowing a student to hear instructional material recorded on the left channel of 2-channel cassette tape 32.

To provide a double actuation control signal, the GOSUB command is repeated:

1540 GOSUB 820
1550 FOR I=1 TO 780: NEXT I
1560 GOSUB 820

In this case, two tones, separated by a one-second delay, are produced by the computer program which, in turn, provides a double actuation control signal. As previously described, cassette player 16 is actuated, allowing a student to hear instructional material recorded on the right channel of a 2-channel lesson tape.

Figure 7:
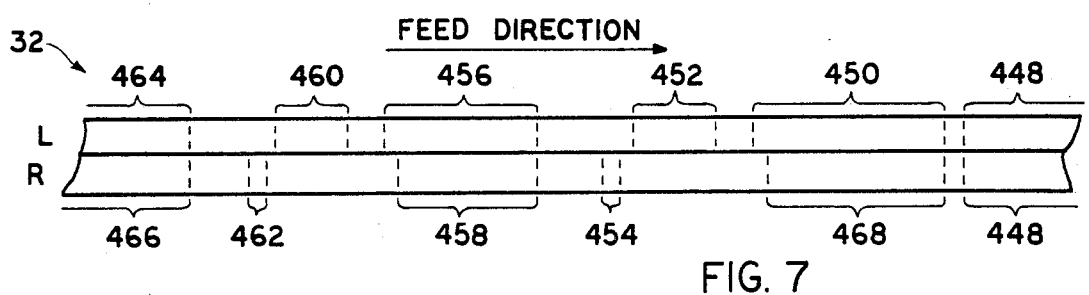
FIG. 7 is a diagrammatic view of a section of a 2-channel audio cassette tape of the present invention.

Referring last of all to FIG. 7, a diagrammatic view of a section of 2-channel cassette tape 32 is shown. At the beginning of each instructional lesson, tape 32 is completely rewound until the tension of leader 448 stops the rewind process. When stereo cassette player 16 (FIG. 1) is initially actuated by a single control signal, a student hears a first introduction narration 450 which has been recorded on the left audio channel. An example of introduction 450 and subsequent audio segment will be later described with reference to a sample lesson.

After an approximate 3-second pause which allows the second (negative-recovery) timer of dual timer 210 (FIG. 4) to drop to logical "0," a first question or problem 452 is recorded on the left audio channel and heard by the student in conjunction with text and graphics presented by a microcomputer 18 (FIG. 1). To stop the cassette player following a recorded question or problem, DTMF control tones 454 are recorded on the right audio channel, which is not heard by the student. If a student response to question or problem 452 is incorrect, a single actuation control signal from light-sensing probe 14, the output port of microcomputer 18, or computer-generated tone again actuates cassette player 16, allowing the student to hear remedial instruction 456 which has been recorded on the left audio channel.

If a student response is correct, a double actuation control signal energizes cassette player 16 and audio relay 66 (FIG. 3), causing the student to hear positive reinforcement 458 recorded on the right audio channel. An approximate 6-second pause is provided between question 452 and remediation 456 or reinforcement 458 to allow time for a double actuation control signal and subsequent channel switching when the student has made a correct response. Reinforcement segment 458 is slightly shorter in duration than remediation segment 456 to assure that reinforcement segment 458 is completed before switching back to the left channel occurs.

Following parallel reinforcement and remediation segments, audio relay 66 (FIG. 3) is automatically turned off, allowing the student to hear a second question or problem 460 recorded on the left audio channel. At this point, cassette player 16 (FIG. 1) is again stopped by additional DTMF control tones 462. If a student response to question 460 is incorrect, remedial instruction 464 is heard; if the response is correct, reinforcement 466 is heard. Similar recorded audio segments are reproduced by stereo cassette player 16 until the lesson is completed.

If, for example, three consecutive student responses are incorrect, the program of microcomputer 18 can require that the lesson be repeated from the beginning. Following tape rewind, a double actuation control signal energizes player 16 and audio relay 66, causing the student to hear a second introduction 468 recorded on the right audio channel. After completion of parallel first and second introductions 450 and 468 (in this case, only introduction 468 is heard by the student), audio relay 66 is turned off and a first question or problem 452 is repeated.

Since "sound-on-sound" recording equipment is not widely available, 2-channel cassette tape 32 can be recorded as follows: (1) All audio segments to be contained on the left channel are first recorded on a monaural cassette tape; (2) The monaural tape is doubled, using a stereo tape deck, onto the left channel of a 2-channel cassette tape while left channel audio segments being dubbed are monitored through headphones; and (3) At appropriate intervals (using left channel audio as cues) all audio segments, including DTMF control tones, to be contained on the right channel are recorded on the right channel of the above-mentioned 2-channel cassette tape.

A phonics lesson will be used as an example to describe the computer-assisted audio/visual teaching system in operation. After the lesson is loaded into microcomputer 18 (FIG. 1) via a magnetic disk 24 and disk drive 28, or program cassette tape 26 and computer cassette recorder 30, a student dons monaural headphones 20 and runs the computer program. The screen of television monitor 22 first displays an introduction of the microcomputer to the student: "HI. MY NAME IS CHARLIE. WHAT IS YOUR NAME?" The student is prompted to type his name, via the computer keyboard, so that his name can be stored as a string variable and used throughout the lesson to personalize the instruction. As soon as the student's name has been entered, the computer monitor displays: "HELLO, JOHN" (or whatever name has been entered). Each time the computer "speaks," via displayed text, the student hears a brief computer-generated "beep" in his headphones. About three-fourths of the monitor screen is next filled with letters of the alphabet, "A" to "Z," and the numerals "0" to "9." At this time, a single actuation control signal is produced by the computer program, causing stereo cassette player 16 to turn on which, in turn, reproduces a first narrative introduction 450 (FIG. 7) which has been recorded on the left channel of 2-channel cassette tape 32: "In this phonics lesson, we will be using a computer, named Charlie, to practice spelling syllables. I will say the syllable, and you will use the computer keyboard to spell the syllable your hear. You will notice the keyboard has all of the letters and numbers you will need to do this lesson.

"Remember that all syllables have one vowel sound. In this lesson, you are going to hear syllables that have one vowel sound and one consonant sound. All of the syllables are going to have a long vowel sound. When you hear a long vowel sound, it is spelled with the name of the letter, followed by the silent 'e.' Remember there are five vowel letters: a, e, i, o, and u. All other alphabet letters are consonants. Usually, consonant letters have only one sound . . . . " When the letters "a, e, i, o, u" are spoken, corresponding letters of the alphabet display are flashed, with the flash statements synchronized with the sound recording by appropriate time delay loops, as shown in computer program statement 200:

200 FOR I=1 TO 36200: NEXT I
210 FOR I=1 TO 200
220 FLASH: HTAB (1): VTAB(10): PRINT "A"
230 NEXT I
240 NORMAL: HTAB(1): VTAB(10): PRINT "A"

As narrative introduction 450 continues, it should be noted that, although only the left audio channel is being used at this time, the student hears sound through both headphones, since they are connected to audio output circuit 56 (FIG. 3) in a monaural configuration. To increase or decrease headphone volume, the student can adjust the volume control potentiometer 188 (FIG. 3).

The lesson narrative introduction continues: " . . . Listen carefully as I say each syllable. After you hear me say the syllable, type it in. Make sure you have typed in the answer you want. If you make a mistake, you can correct it before pressing 'return.' You don't have to hurry; the computer will wait for your answers. If you have typed in the right answer, your score will show one right. If your answer is wrong, your score will show one wrong. If you have typed three wrong answers in a row, the computer will tell you to rewind your tape to the beginning and to start over by typing in the number '5.' (When the number "5" is spoken, a number "5" displayed by the monitor flashes in synchronization, as above-described using an appropriate time delay loop.)

"I am now going to say the syllable. Be ready to type in your answer to make the lesson continue." The end of narrative introduction 450 is followed by a 3-second pause. Next, the student hears a first problem 452: "The 1st syllable is 'sae.'" At this point, the computer program has stopped running and waits for a student response input, and stereo cassette player 16 (FIG. 1) is stopped by DTMF control tones 454 (FIG. 7) recorded on the right audio channel. The tones are detected and decoded by audio control module 10 but not heard by the student. In readiness for a student response to the pronounced syllable sound, television monitor 22 now displays a score box to show the student's total correct and incorrect responses.

If the student's typed response is something other than "sae," the score box shows 1 wrong, and a brief "beep" preceeds the computer statement displayed by monitor 22: "YOUR ANSWER, SAY (or whatever the student type incorrectly), IS WRONG, JOHN. THE RIGHT ANSWER IS: SAE." Immediately the computer program executes a single actuation control signal which energizes stereo cassette player 16, causing remedial instruction 456 to be heard: "You're wrong. The syllable 'sae' is spelled 's-a-e.' Remember that the 'a' sound is spelled 'ae.' For a vowel to say its name, it must be followed by the silent 'e.'"

In the above example, if the student had typed in the correct response, "sae," the displayed score box would show "1 right," and a brief "beep" would preceed the computer statement displayed by monitor 22: "YOUR ANSWER, SAE, IS RIGHT, JOHN." With each few correct responses, the computer also displays its own positive reinforcement, such as "GOOD WORK!" or "KEEP IT UP!" etc. in teletype fashion with appropriate "teletype" sound effects. Immediately the computer program executes a double actuation control signal which energizes stereo cassette player 16 and audio relay 66 (FIG. 3), causing positive reinforcement 458 on the right audio channel to be heard: "You're right. I'm glad to see you remember the silent 'e.' Listen carefully for the syllable which I will say next. It should be easy."

There is no limitation on the length of recorded positive reinforcement or remedial instruction which is presented, although, as previously described, positive reinforcement narration must be slightly shorter than remedial narration. As previously shown, when positive reinforcement is being heard by a student, audio relay 66 is energized and remains so until remedial instruction (which is detected by sound-actuation switch 64 and which continuously retriggers the negative-recovery timer of dual time 210) ends. When silence occurs on the left channel, shift register 204 (FIG. 4) is reset and audio relay 66 (FIG. 3) is de-energized, again switching the audio output to the left channel. If recorded positive reinforcement segment 458 (FIG. 7) on the right channel exceeds remediation segment 456 on the left channel, switching will occur before the positive reinforcement segment is completed. Once switching has occured (so that the left audio channel is again heard by the student), a second problem 460 is presented: "The second syllable is 'see.'" At this point, additional DTMF control tones 462 recorded on the right channel cause cassette player 16 to stop, and the above process is repeated when the student types in his new response. If the student response is incorrect, remediation segment 464 is heard; if the response is correct, reinforcement segment 466 is heard.

In the phonics lesson used here as an example, sixteen syllable sounds are presented. The microcomputer keeps a record of a student's right and wrong responses, and requires that the student start over when three consecutive wrong responses are typed in. To rewind 2-channel cassette tape 32, plug 228 of tape player control output 196 (FIG. 4) is temporarily removed from miniature jack 46 of power control module 12 (FIG. 2) to provide manual control to stereo cassette player 16. When the computer program is repeated because of three consecutive wrong answers, the computer's "introduction" and student entry of his name are automatically skipped, since the student's name has already been entered in the computer's memory.

When the computer program is repeated, as above-described, microcomputer 18 branches to a new text and graphics subroutine, as well as to a double actuation control signal subroutine which actuates both stereo cassette player 16 and audio relay 66. At this point, a second introduction narrative 468 (FIG. 7) is heard by the student which includes additional examples of syllables in conjunction with rules for spelling them. As before, the graphics display is synchronized with the audio recording by appropriate time delay loops within the computer subroutine. When second introduction narrative 468 is complete, channel switching occurs, and first problem 452 (FIG. 7) is again heard by the student.

Menu-driven programs more complex than the one described above, providing a number of optional templates and sprites, can be provided for educators who wish to modify the subject matter, graphics, type or number of questions and problems posed. When using menu-driven programs, no technical programming skills are needed. As has been described, the computer-assisted audio/visual teaching system of the present invention provides the student with instructional lessons which utilize computer text, graphics and sound effects, as well as recorded voice which includes both positive reinforcement and remedial instruction. All of the audio portion of any lesson is presented to the student via monaural headphones, so that the remainder of the class will not be disturbed. For a group demonstration, a small amplifier/speaker can be substituted for the monaural headphones 20.

Although power supply lines have been shown schematically for nearly all components of the computer-assisted audio/visual teaching system, supply lines are presumed, but not shown, for individual gates and inverters in order to simplify drawings. Several bypass capacitors are also needed in conjunction with the various CMOS integrated circuits, and are presumed even though they are not shown.

The terms and expressions which have been employed in the foregoing drawings, abstract, and specification are used herein as terms of description and not of limitation; it being understood that changes may be made in the embodiment disclosed without departing from the spirit and scope of the invention as defined in the following claims.

What is claimed is:

1. A computer-assisted audio/visual teaching system for presenting synchronized audio and visual instructional material comprising in combination;

microcomputer means for running an instructional program, said microcomputer means further including sound effects generation means and alphanumeric keyboard means for entering student responses into said microcomputer means;

television monitor means operatively connected to said microcomputer means for displaying text and graphics of said instructional program;

magnetic record means for permanently storing said instructional program;

magnetic record reproducing means operatively connected to said microcomputer means for loading said instructional program into said microcomputer means;

plural channel audio record means containing differing instructional narrative, positive reinforcement, and remedial instruction recorded on two parallel channels and related control tones recorded on one parallel channel for permanently storing the audio portion of said synchronized audio and visual instructional material, said control tones being recorded at selected intervals where it is desired to stop said plural channel audio record means;

plural channel audio record reproduction means for reproducing said instructional narrative, positive reinforcement, and remedial instruction and said control tones of said plural channel audio record means;

power control means operatively associated with the power supply circuit of said plural channel audio record reproduction means and an external power source for selectively supplying power from said external power source to said plural channel audio record reproduction means;

audio control means operatively associated with the audio output of said plural channel audio record reproduction means, said microcomputer means, and said power control means for processing and distributing said audio output of said plural channel audio record reproduction means and said sound effects generation means of said microcomputer means and for selectively controlling the power output of said power control means; and transducer means operatively connected to said audio control means for reproducing the processed and distributed audio output of said audio control means, wherein said audio control means further include:

rechargeable power supply means for energizing said audio control means;

low battery indicator means operatively associated with said rechargeable power supply means for indicating when said power supply means require recharging;

power switch means for controlling power to said audio control means;

audio input circuit means comprising a first connector means for connecting a first input channel and a second input channel of said audio control means to a like first and second channel of said audio record reproduction means;

sound-actuated switch means operatively associated with said first input channel for detecting recorded sound on said first input channel and providing a logical signal in response to said recorded sound;

control tone receiver means operatively associated with said second input channel for detecting recorded control tones on said second input channel and providing a logical signal in response to said recorded control tones;

computer sound effects input circuit comprising a second connector means and audio transformer means for coupling computer sound effects with said audio control means;

volume control means operatively connected to said computer sound effects input circuit for adjusting volume of said sound effects of said microcomputer means;

sound effects preamplification and amplification means operatively associated with said volume control means for amplifying said computer sound effects;

light-sensing input circuit means comprising a third connector means and amplifying means for selectively connecting said audio control means to light-sensing means and amplifying actuation control signals of said television monitor means;

computer port input means comprising a fourth connector means for selectively connecting said audio control means to an output port of said microcomputer means and for providing a logical signal in response to said actuation control signals of said microcomputer means;

computer tone receiver means operatively associated with the output of said sound effects preamplification and amplification means for detecting a discrete sound effects tone and providing actuation control signals in response to said sound effects tone;

gating means operatively associated with said light-sensing input circuit means, said computer port input means, and said computer tone receiver means for transmitting said actuation control signals of said light-sensing input circuit means, said computer port means, and said computer tone receiver means;

mode switching means and inverting means operatively associated with said gating means for selectively conditioning said actuation control signals of said light-sensing input circuit means to be compatible with a black-on-white and white-on-black display of said microcomputer means and television monitor means;

silicon controlled rectifier means operatively associated with said power control means, the output of said mode switching means, and said control tone receiver means, said controlled rectifier means made conductive by said actuation control signals and made non-conductive by said recorded control tones for selectively energizing the output of said power control means and associated said audio record reproduction means;

control output means operatively associated with said silicon controlled rectifier means comprising a fifth connector means for electrically connecting said silicon controlled rectifier means to said tape player control input means of said power control means;

clock means operatively associated with the output of said mode switching means for providing a single clock pulse in response to each actuation control signal of said light-sensing input circuit means, said computer port input means, and said computer tone receiver means;

shift register means operatively associated with said clock means for providing a logical output when twice clocked by said clock means in response to two actuation control signals of said light-sensing input circuit means, said computer port input means, and said computer tone receiver means;

audio relay means, the first and second fixed contacts thereof being operatively associated with said first input channel and second input channel of said audio control means, the relay coil thereof being operatively associated with the output of said shift register means for providing an audio output of said first input channel when said relay coil is not energized in response to a single actuation control signal and providing an audio output of said second input channel when said relay coil is energized in response to two actuation control signals;

missing-pulse detector means operatively associated with the output of said sound-actuated switch means for providing a logical output when a brief period of recorded silence is detected on said first input channel by said sound-actuated switch means;

first shift register reset means operatively associated with said missing-pulse detector means for resetting said shift register means in response to said brief period of recorded silence, thereby de-energizing said relay coil of said audio relay means and switching the audio output of said second input channel to said first input channel, said missing-pulse detector preventing switching from said second input channel to said input channel while a recorded instructional segment is in progress on said first channel;

second shift register reset means operatively associated with said mode switching means for resetting said shift register means in response to a said actuation control signal subsequent to a predetermined delay; and audio output circuit means operatively associated with a wiper contact of said audio relay means and said sound effects preamplification and amplification means for providing an audio output comprising either said first input channel or said second input channel and said sound effects of said microcomputer means.

2. A computer-assisted audio/visual teaching system according to claim 1, further comprising:

light-sensing means selectively affixed to the screen of said television monitor means and operatively associated with said audio control means for selectively energizing the power output of said power control means and selecting for distribution one channel of said plural channel audio record reproduction means in response to actuation control signals of said television monitor means, said actuation control signals being initiated by said instructional program of said microcomputer means when it is desired to energize said audio record reproduction means.

3. A computer-assisted audio/visual teaching system according to claim 2, wherein said light-sensing means further comprise:

a photodetector, the light-sensitive surface thereof being affixed to the screen surface of said television monitor means, said photodetector being electrically connected to said audio control for actuating said audio record reproduction means in response to a control square displayed against said light-sensitive surface of said photodetector by said television monitor means.

4. A computer-assisted audio/visual teaching system according to claim 3, wherein said control square is initiated by an instructional program of said microcomputer means, said control square being light when said microcomputer means display format is white-on-black and dark when said display format is black-on-white.

5. A computer-assisted audio/visual teaching system according to claim 1, wherein said differing instructional narrative, positive reinforcement, and remedial instruction of said plural channel audio record means are recorded in related and sequential segments, whereby a first instructional narrative is recorded on a first audio channel in parallel juxtaposition with a second instructional narrative recorded on a second audio channel, said remedial instruction being recorded on a first audio channel in parallel juxtaposition with said positive reinforcement recorded on a second audio channel for selectively providing either said first instructional narrative or said second instructional narrative or said remedial instruction or said positive reinforcement, as determined by the audio channel being distributed by said audio control means to said transducer means.

6. A computer-assisted audio/visual teaching system according to claim 1, wherein said power control means further include:

input power connection means for connecting said power control means to said external power source;

power leads electrically connected to said input power connection means and energized by said external power source;

capacitor means electrically connected across said power leads for filtering said external power source;

indicator means electrically connected across said power leads for indicating when said power control means are energized;

output power connection means operatively associated with said power leads for connecting said power control means to said audio record reproduction means; and tape player control input means electrically connected between one of said power leads and one of said output power connection means for selectively energizing said output connection means and associated said audio record reproduction means when said audio control means are connected to said tape player control input means, wherein said output power means and said associated audio record reproduction means are continuously energized when said audio control means are not connected to said tape player control input means.

7. A computer-assisted audio/visual teaching system according to claim 1, wherein said second shift register reset means further comprise:

gating means operatively associated with the output of said second shift register reset means and said shift register means for inhibiting said second shift register reset means when said audio relay means are energized.

8. A computer-assisted audio/visual teaching system according to claim 1, wherein said audio output circuit means further comprise:

audio output transformer means operatively associated with said wiper contact of said audio relay means and said sound effects preamplification and amplification means;

adjustable volume control means operatively associated with said audio output transformer means for student volume adjustment; and a sixth connector means operatively associated with said adjustable volume control means for connecting said transducer means to said audio output circuit means of said audio control means.

9. A computer-assisted audio/visual teaching system according to claim 1, wherein said missing-pulse detector means are operatively associated with the output of said shift register means for preventing triggering of said missing-pulse detector means by spurious sound, whereby said missing-pulse detector means are inhibited until said audio relay means are energized.

10. A computer-assisted audio/visual teaching system according to claim 1, wherein said power switch means simultaneously control positive and negative supply lines of said audio control means for preventing sound from being heard from said audio output circuit means unless said power switch means are closed and said audio control means are energized.

11. A computer-assisted audio/visual teaching system according to claim 1, wherein indicator means are operatively associated with the gate of said silicon controlled rectifier means for providing visual indication of when said silicon controlled rectifier means are triggered by actuation control signals of said light-sensing input circuit means, computer port input means, and computer tone receiver means as an aid in correctly positioning said light-sensing means on the screen of said television monitor means and tuning said computer tone receiver means to be responsive to said discrete sound effects tone.

12. A computer-assisted audio/visual teaching system according to claim 1, wherein said computer sound effects input circuit means further comprise:
a selectively connected suction cup induction coil for detecting microcomputer sound effects in the vicinity of a microcomputer speaker or television monitor speaker when no microcomputer audio output jack is available.

* * * * *

UNITED STATES PATENT AND TRADEMARK OFFICE
CERTIFICATE OF CORRECTION

PATENT NO. : 4,586,905

DATED : May 6, 1986

INVENTOR(S) : James W. Groff

It is certified that error appears in the above-identified patent and that said Letters Patent is hereby corrected as shown below:

In the abstract, column 2, lines 21 and 22, "deenergized" should read -- de-energized --.

Column 2, line 19, "by" should read -- be --.

Column 3, line 67, "head" should read -- heard --.

Column 7, line 5, "abovementioned" should read -- above-mentioned --.

Column 8, line 15, "110" should read -- 100 --.

Column 17, line 17, "abovedescribed" should read -- above-described --.

Column 18, line 42, "screen" should read -- screens --.

Column 19, line 60, "is" should read -- are --.

Column 21, line 30, "doubled" should read -- dubbed --.

Column 23, line 25, "time" should read -- timer --.

Column 24, line 38, "combination;" should read -- combination: --.

Column 25, line 41, "circuit" should read -- circuit means --.

UNITED STATES PATENT AND TRADEMARK OFFICE
CERTIFICATE OF CORRECTION

PATENT NO. : 4,586,905

DATED : May 6, 1986

INVENTOR(S) : James W. Groff

It is certified that error appears in the above-identified patent and that said Letters Patent is hereby corrected as shown below:

Column 27, line 35, "control" should read — control means —.

Signed and Sealed this

Fifth Day of August 1986

[SEAL]

Attest:

DONALD J. QUIGG

Attesting Officer

Commissioner of Patents and Trademarks